United States Patent
Lin et al.

(10) Patent No.: US 7,805,175 B2
(45) Date of Patent: Sep. 28, 2010

(54) MICROARRAY BIOPROBE DEVICE INTEGRATED WITH A SEMICONDUCTOR AMPLIFIER MODULE ON A FLEXIBLE SUBSTRATE

(75) Inventors: Jium Ming Lin, Hsinchu (TW); Li-Chern Pan, Taipei (TW); Po-Wei Lin, Taipei (TW)

(73) Assignee: Chung Hua University, Hsin Chu (TW)

( * ) Notice: Subject to any disclaimer, the term of this patent is extended or adjusted under 35 U.S.C. 154(b) by 1022 days.

(21) Appl. No.: 11/545,687

(22) Filed: Oct. 11, 2006

(65) Prior Publication Data
US 2008/0008626 A1  Jan. 10, 2008

(30) Foreign Application Priority Data
Jun. 22, 2006  (TW) .............................. 95122442 A

(51) Int. Cl.
*A61B 5/04* (2006.01)
(52) U.S. Cl. ...................................... 600/393; 600/372
(58) Field of Classification Search ................. 600/373, 600/377, 378.547, 372, 393
See application file for complete search history.

(56) References Cited

U.S. PATENT DOCUMENTS

| | | | | |
|---|---|---|---|---|
| 4,969,468 | A | * | 11/1990 | Byers et al. .................. 600/373 |
| 7,212,851 | B2 | * | 5/2007 | Donoghue et al. ........... 600/544 |
| 2004/0006264 | A1 | * | 1/2004 | Mojarradi et al. ............ 600/378 |
| 2009/0318824 | A1 | * | 12/2009 | Nishida et al. ............... 600/544 |

* cited by examiner

*Primary Examiner*—Lee S Cohen
(74) *Attorney, Agent, or Firm*—Tim Tingkang Xia; Morris, Manning & Martin LLP

(57) ABSTRACT

The present invention provides a microarray bioprobe device integrated with a semiconductor amplifier module, which integrates micro array biological probes and thin film transistors on a flexible substrate by Micro-Electro-Mechanical System (MEMS) processes and semiconductor processes. A signal from the microarray bioprobe device is amplified through a near amplifier to increase signal-to-noise ratio and impendence matching. The micro array biological probes of the present invention are produced on the flexible substrate such that the micro array biological probes can be disposed to conform to the profile of a living body's portion and improving contact between the probes and living body's portion.

17 Claims, 4 Drawing Sheets

MICROARRAY BIOPROBE DEVICE INTEGRATED WITH A SEMICONDUCTOR AMPLIFIER MODULE ON A FLEXIBLE SUBSTRATE

BACKGROUND OF THE INVENTION

1. Field of the Invention

The present invention relates to a microarray bioprobe device integrated with a semiconductor amplifier module, and more particularly, to a microarray bioprobe device integrated with a semiconductor amplifier module on a flexible substrate by Micro-Electro-Mechanical System (MEMS) processes and semiconductor processes.

2. Description of Related Art

Conventional micro array biological probes are produced on a hard silicon wafer substrate. The product is not only heavy and frangible but also high temperature processes needed. The manufacture cost is expensive. Moreover, the conventional micro array biological probes fail to be designed and disposed relying on the profile of a living body's portion, and adversely affecting contact between the biological probes and living body. Besides, after a signal detected from the conventional micro array biological probes, the signal is picked up to process signal-to-noise ratio and impedance matching. Additional devices for signal processing are required. Thus, the manufacture cost of the conventional micro array probes requires more, and the manufacturing complexity is high. Although the signal-to-noise ratio and impendence matching can be improved by integrating the conventional micro array biological probes and a transistor amplifier for signal processing together, both of them are produced on the hard silicon wafer substrate, and thus the product still fails to be designed and disposed relying on the profile of the living body's portion.

In case that the conventional micro array biological probe element is produced on a flexible substrate, it can be designed and disposed relying on the profile of the living body's portion to increase the contact effect between the biological probes and living body. However, in view of the current technology, the conventional micro array biological probes and the transistor amplifier can not be integrated together to obtain better results of signal processing for facilitating further analysis and determination. The reason is that high temperature is required in the manufacture process of the transistor amplifier, and the flexible substrate will be deformed at this high temperature. As such, it is difficult to produce the transistor amplifier on the flexible substrate.

For the current micro array biological probe technology, there is lack of a micro array biological probe element capable of mass-produced, cost effective, being designed and disposed relying on the profile of the living body's portion, and also improving the signal-to-noise ratio and impedance matching.

SUMMARY OF THE INVENTION

The objective of the present invention is to provide a microarray bioprobe device integrated with a semiconductor amplifier module, which integrates micro array biological probes and thin film transistors on a flexible substrate by Micro-Electro-Mechanical System (MEMS) processes and semiconductor processes to improve the contact between the probes and living body and also the signal-to-noise ratio.

To achieve the objective, a microarray bioprobe device integrated with a semiconductor amplifier module of the present invention includes a first flexible substrate, a plurality of biological probes, a second flexible substrate, and at least one transistor amplifier and a plurality of lead wires. The first flexible substrate has a plurality of first conducting wires formed therein, by which electrical transmission is generated between a first and second surfaces of the first flexible substrate. The plurality of biological probes is formed on the first surface of the first flexible substrate, and each of the biological probes respectively electrically connects with one of the conducting wires corresponding thereto. The second flexible substrate has a plurality of second conducting wires formed therein, and by which an electrical transmission is generated between an upper and lower surfaces of the second flexible substrate, and the lower surface of the second flexible substrate is electrically jointed to the second surface of the first flexible substrate. The at least one transistor amplifier and a plurality of lead wires are formed on the upper surface of the second flexible substrate, wherein each of the lead wires is respectively electrically connected with one of the second conducting wires corresponding thereto. Electrical signals are transmitted between the biological probes and the transistor amplifiers by the first conducting wires, the second conducting wires and the lead wires.

On the other hand, the biological probe has a tip end to facilitate thrusting into the living body to decrease the contact impedance. The present invention can vary the density, occupied area and sharpness of the tip ends of the probes to change the contact impedance so as to meet different needs.

The present invention can integrate the micro array biological probes and the semiconductor amplifier module together on the flexible substrate such that the product of the present invention can be designed for roll-to roll types to facilitate mass-produced.

DETAILED DESCRIPTION OF THE PREFERRED EMBODIMENTS

The present invention employs the MEMS process and semiconductor process to integrate thin film transistor (TFT) amplifiers and micro array biological probes on the flexible substrate. It becomes possible to dispose the microarray bioprobe device in conformity with the profile of the living body's portion by forming the microarray bioprobe device on the flexible substrate. As such, the contact effect between the biological probes and living body becomes better. On the other hand, the TFT amplifier is also produced on the flexible substrate such that a signal detected from the biological probes can be amplified through a short path. The signal-to-noise ratio and impedance matching are improved, and the cost of manufacture is decreased.

The microarray bioprobe device integrated with the semiconductor amplifier of the present invention will be described in detail in the following according to preferred embodiments and accompanying drawing.

Figure 1A:
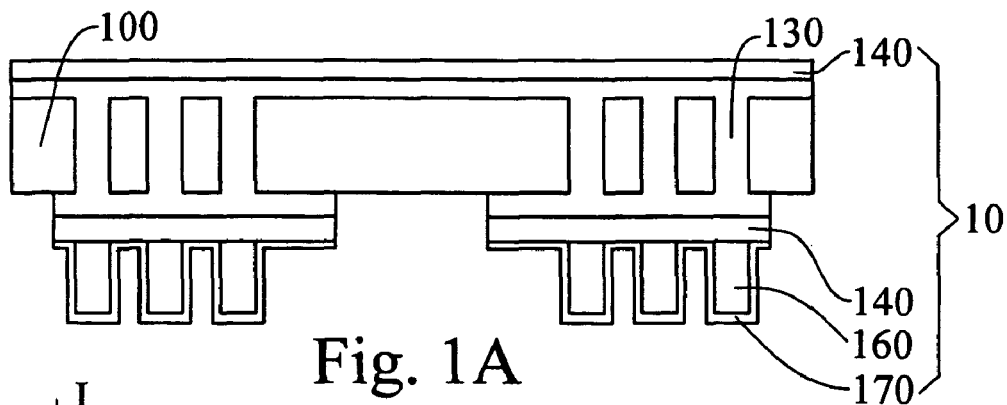
FIG. 1A is a schematic cross-sectional view of a microarray bioprobe device of the present invention.
Figure 1B:
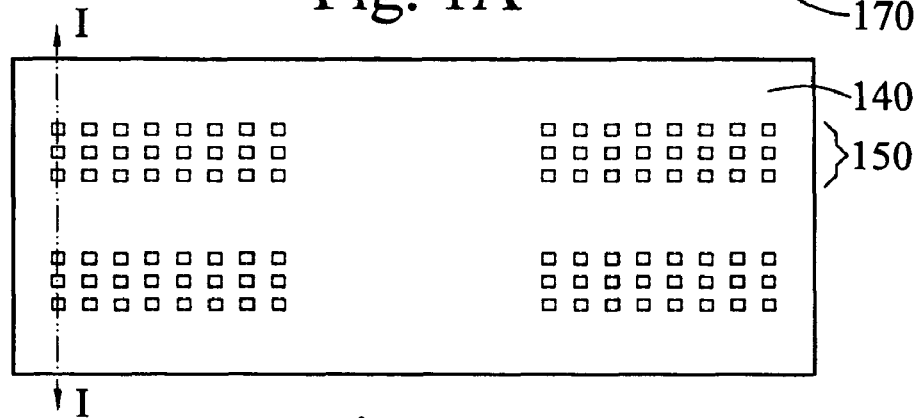
FIG. 1B is a schematic bottom view of FIG. 1A.
Figure 5:
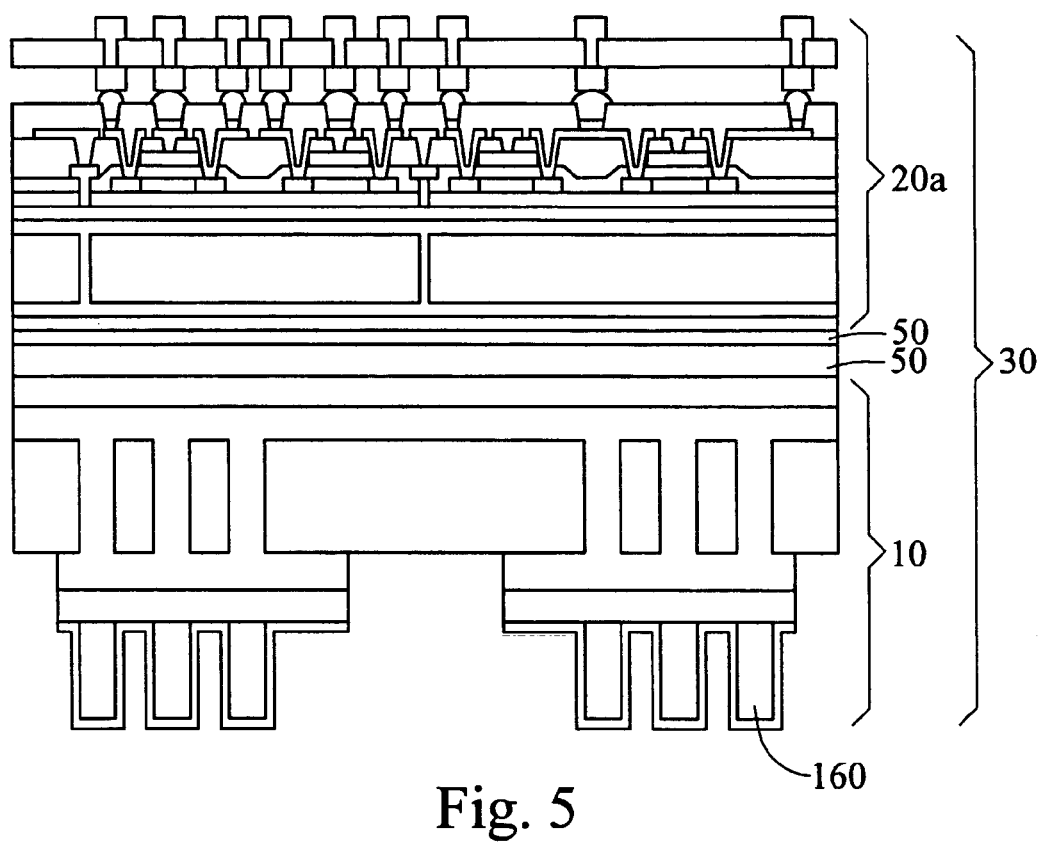
FIG. 5 is a schematic cross-sectional view of the microarray bioprobe device integrated with the semiconductor amplifier module of the present invention.

FIG. 5 is a schematic cross-sectional view of the microarray bioprobe device 30 integrated with the semiconductor amplifier module according to a preferred embodiment of the present invention. The microarray bioprobe device 30 integrated with the semiconductor amplifier module comprises: micro array biological probe element 10 and a semiconductor amplifier and interface integrated module 20a. FIG. 1A is a schematic cross-sectional view of the micro array biological probe element 10, and FIG. 1B is a schematic bottom view of FIG. 1A. The micro array biological probe element 10 comprises: a first flexible substrate 100, for example a flexible plastic substrate; a plurality of first conducting wires 130 passing through the first flexible substrate 100 to establish electrical connection between first and second surfaces of the first flexible substrate 100, and the first conducting wires 130 can be formed of titanium or titanium nitride; a first conducting seeding layer 140 formed on an upper side of the first surface and a lower side of the second surface of the first flexible substrate 100 in electrical connection with the first conducting wires 130, and the first conducting seeding layer 140 can be formed of copper, nickel or gold; a micro array biological probe module comprising a plurality of groups of array-typed biological probes 150 formed on the lower side of the first conducting seeding layer 140 of the first surface of the first flexible substrate 100, and each of the biological probes 160 electrically connects with one of the first conducting wires 130 corresponding thereto; and a biological compatible conducting layer 170 covering the array biological probe module to be as an interface layer of the array-typed biological probes 150 for contacting the living body, and the biological compatible conducting layer 170 can be formed of titanium, titanium nitride or other biological compatible metals having high hardness with a thickness of 1 to 5 μm, generally a thickness of 2 μm.

Figure 2A:
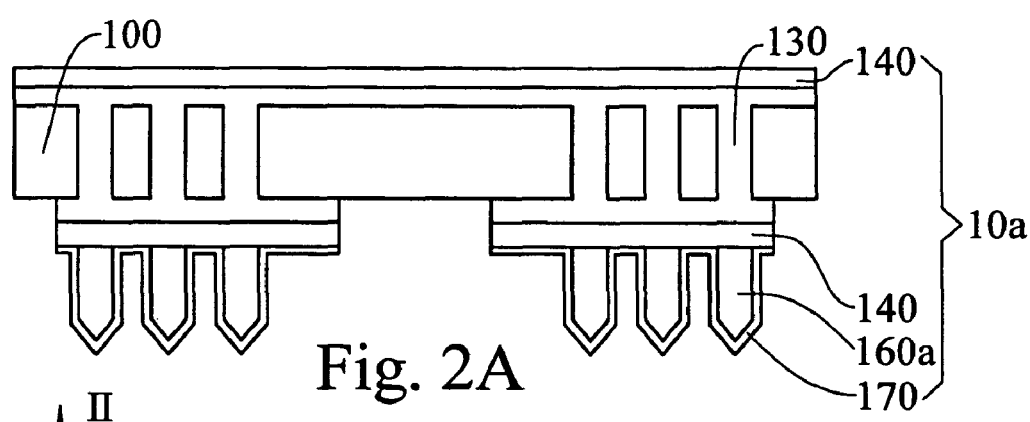
FIG. 2A is a schematic cross-sectional view of the microarray bioprobe device according to another embodiment of the present invention.
Figure 2B:
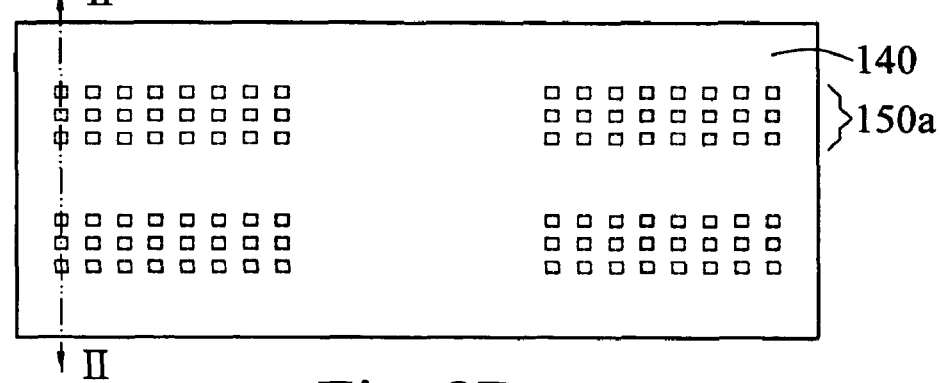
FIG. 2B is a schematic bottom view of FIG. 2A.

FIG. 2A is a schematic cross-sectional view of the microarray bioprobe device according to another preferred embodiment of the present invention. The only difference between this preferred embodiment and that of FIG. 1A is that each of biological probes 160a has a tip end for facilitating thrusting into the living body to decrease the contact impedance, and it is suitable for high-current signal input and output.

On the other hand, the present invention can change the density, occupied area and sharpness of the tip ends of the biological probes so as to change the impedance for meeting different needs.

Figure 3A:
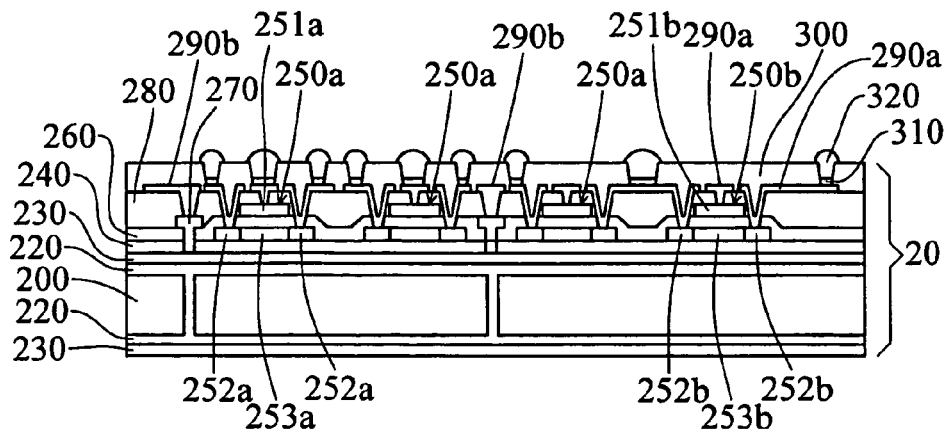
FIG. 3A is a schematic cross-sectional view of a semiconductor amplifier module of the present invention.
Figure 3B:
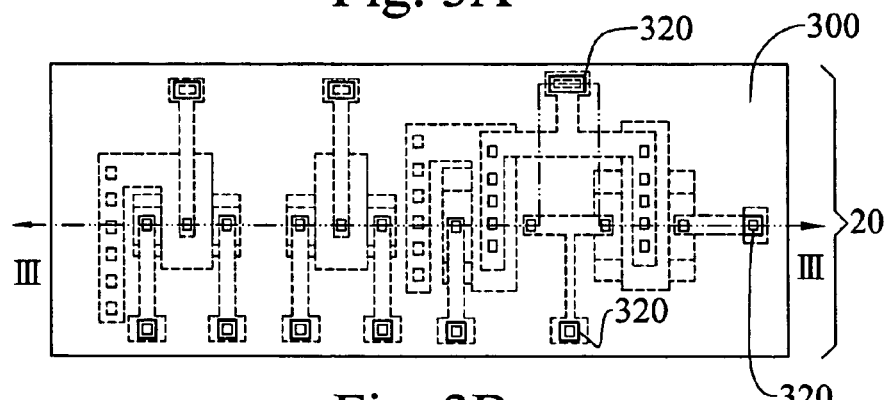
FIG. 3B is a schematic top view of FIG. 3A.
Figure 3C:
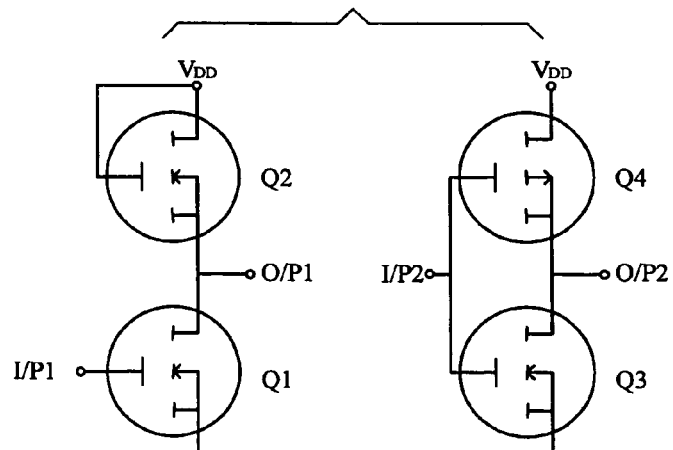
FIG. 3C is a schematic view of two inverting amplifier circuits formed of the semiconductor amplifier module of FIG. 3A.

FIG. 3A is a schematic cross-sectional view of a semiconductor amplifier module 20 integrated with the microarray bioprobe device 30 of the present invention, and FIG. 3B is a schematic top view of FIG. 3A. The semiconductor amplifier module 20 comprises: a second flexible substrate 200, for example a flexible plastic substrate; a plurality of second conducting wires 220 passing through the second flexible substrate 200 to transmit signals between two surfaces thereof, and the second conducting wires 200 can be formed of titanium, titanium nitride or other metals with high hardness and high adhesiveness; a second conducting layer 230, for example a copper layer is formed on the upper side of the second conducting wires 220 of the upper surface of the second flexible plastic substrate 200 and on the lower side of the second conducting wires 220 of the lower surface of the second flexible plastic substrate 200; a first dielectric layer 240, such as a silicon dioxide ($SiO_2$) layer, a silicon nitride ($Si_3N_4$) layer or other insulating layers, formed on the second conducting layer 230 of the upper surface of the second flexible substrate 200; a second dielectric layer 260, for example a silicon dioxide ($SiO_2$) layer, formed on the upper side of the first dielectric layer 240; at least three first conductive type thin film transistors 250a with top gates (for example NMOS) and at least one second conductive type thin film transistor 250b with a top gate (for example PMOS) are formed on the upper side of the first dielectric layer 240, and a portion of the second dielectric layer 260 is provided as gate oxide layers of the thin film transistors 250a and 250b, and each of the first conductive type transistors 250a with the top gates comprises a gate 251a, a pair of source/drain 252a and a first conductive type channel 253a, and the second conductive type transistor 250b with the top gate comprises a gate 251b, a pair of source/drain 252b and a second conductive type channel 253b, and the aforesaid at least four thin film transistors constitute two groups of inverting amplifiers whose schematic circuits are shown in FIG. 3C; a plurality of lead wires 270 passing through the first dielectric layer 240 and second dielectric layer 260, and each of the lead wires 270 electrically connects with one of the second conducting wires 220 corresponding thereto; a third dielectric layer 280, for example a silicon nitride ($Si_3N_4$) layer, a silicon dioxide ($SiO_2$) layer or other insulating layers, is formed on the first conductive type thin film transistors 250a with the top gates, the second conductive type thin film transistor 250b with the top gate and the lead wires 270; a plurality of third conducting wires 290a and a plurality of first pads 290b are formed in the via holes of the third dielectric layer 280 and on the surface thereof, and the conducting wires 290a electrically connect with the gates 251a, sources/drains 252a of the first conductive type thin film transistors 250a with the top gates, source/drain 252b of the second conductive type thin film transistor 250b with the top gate, and the first pads 290b electrically connect with the lead wires 270; an insulating protecting layer 300 formed on the third conducting wire 290a and the first pad 290b so as to isolate humidity and protect the thin film transistors underneath, and the protecting layer 300 can be a silicon dioxide ($SiO_2$) layer, a silicon nitride ($Si_3N_4$) layer or other insulating layers; a plurality of second pads 310 is respectively formed in through holes of the protecting layer 300 on the upper side of the third conducting wires 290a; a plurality of first conducting bumps 320 formed on the second pads 310, and facilitating to establish electrical connection with the power, ground and input/output interface plate (electrical connectors such as BNC connectors are formed on a backside thereof).

Figure 4A:
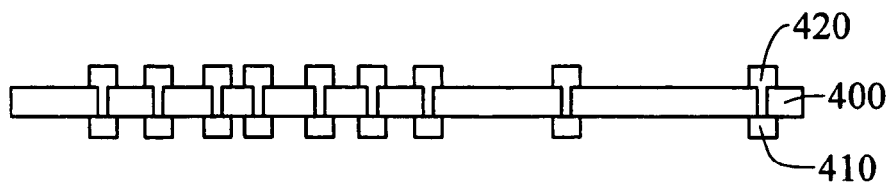
FIG. 4A is a schematic cross-sectional view of an interface module provided with power, ground and input/output electrical connectors of the present invention.
Figure 4B:
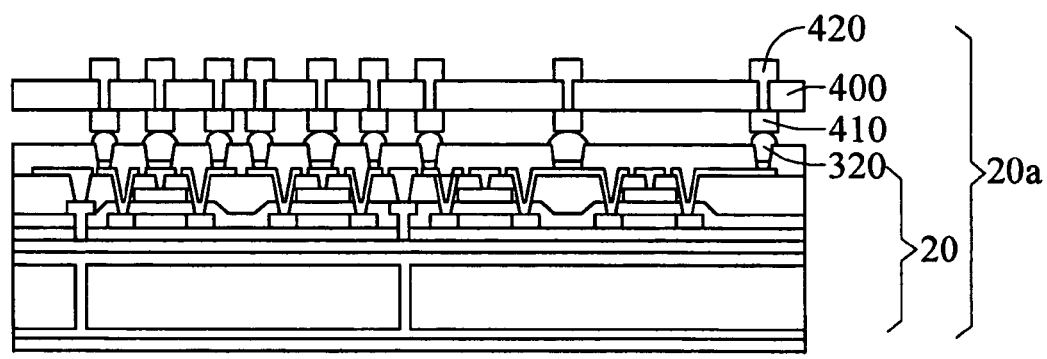
FIG. 4B is a schematic cross-sectional view of a semiconductor amplifier module and interface integrated module of the present invention.
Figure 4C:
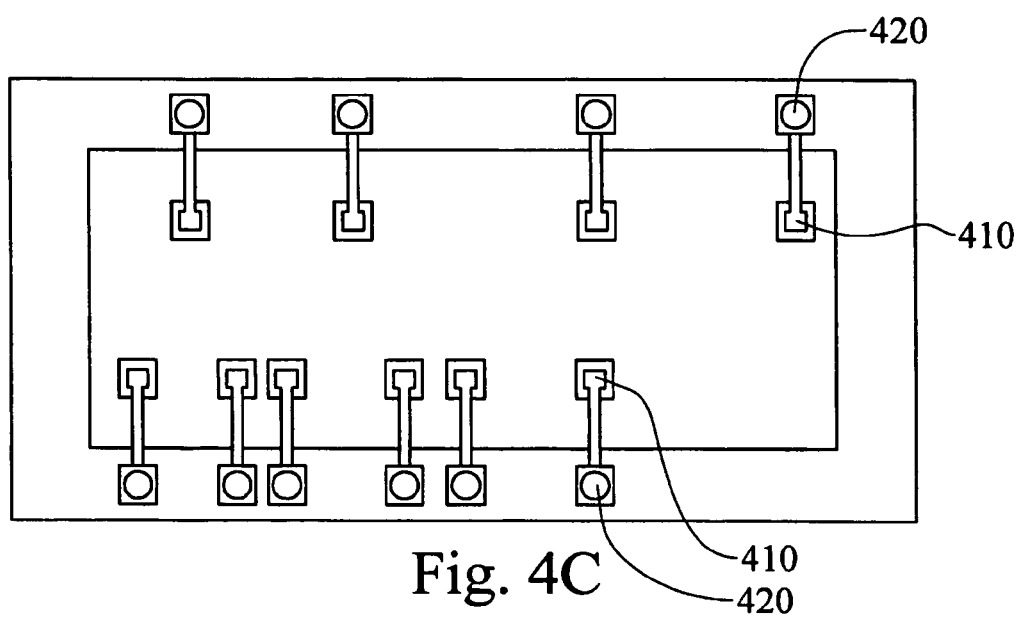
FIG. 4C is a schematic top view of FIG. 4B.

FIG. 4A is a schematic cross-sectional view of the interface plate 400 having the power, ground and input/output electrical connectors of the present invention, in which a plurality of second conducting bumps 410 are formed on a lower surface of the interface plate 400, and each of the second conducting bumps 410 corresponds to one of the electrical connector 420. The interface plate 400 is integrated with the semiconductor amplifier module 20 to form the semiconductor amplifier and interface integrating module 20a, as shown in FIG. 4B. FIG. 4C is a schematic top view of the semiconductor amplifier and interface integrating module 20a. Referring to FIG. 4B, the conducting bumps 320 of the semiconductor amplifier module 20 are aligned to and jointed to the conducting bumps 410 of the interface plate 400 to form the semiconductor amplifier and interface integrating module 20a.

Referring to FIG. 5 again, which is the schematic cross-sectional view of the microarray bioprobe device 30 integrated with the semiconductor amplifier module of the present invention, in which the semiconductor amplifier and interface integrating module 20a and the micro array biological probe element 10 are jointed together by back-to-back. For example, a layer of conducting glue 50, like sliver glue or solder, is coated on the back of the semiconductor amplifier and interface integrating module 20a, and likewise, a layer of conducting glue 50, like sliver glue or solder, is coated on the back of the micro array biological probe element 10. The semiconductor amplifier and interface integrating module 20a and the micro array biological probe element 10 are jointed together by back-to-back through both layers of the conducting glue 50 or solder to form the micro array biological probe element 30 integrated with the semiconductor amplifier module of the present invention. Moreover, because the silver glue can be soften and then separated from where it is coated after heating with the temperature lower than the glass transition temperature of the flexible substrate, it facilitates to replace the micro array biological probe element 10 by using the silver glue as the joint agent. The maintenance fee of the microarray bioprobe device 30 integrated with the semiconductor amplifier module of the present invention can be decreased.

On the other hand, the sliver glue can be replaced by a double-sided conducting film or a double-sided conducting tape to joint the semiconductor amplifier and interface integrating module 20a and the micro array biological probe element 10.

The present invention integrates the micro array biological probe element and the semiconductor amplifier on the flexible substrate such that the product of the present invention can be designed for roll-to roll type, and facilitating mass-produced.

While the invention has been described by way of examples and in terms of preferred embodiments, it is to be understood that those who are familiar with the subject art can carry out various modifications and similar arrangements and procedures described in the present invention and also achieve the effect of the present invention. Hence, it is to be understood that the description of the present invention should be accorded with the broadest interpretation to those who are familiar with the subject art, and the invention is not limited thereto.

What is claimed is:

1. A microarray bioprobe device integrated with a semiconductor amplifier module comprising:
    a first flexible substrate having a plurality of first conducting wires formed therein, by which electrical transmission is generated between a first and second surfaces of said first flexible substrate;
    a plurality of biological probes formed on said first surface of said first flexible substrate, each of said biological probes electrically connecting with corresponding one of said conducting wires respectively;
    a second flexible substrate having a plurality of second conducting wires formed therein, by which an electrical transmission is generated between an upper and lower surfaces of said second flexible substrate, and said lower surface of said second flexible substrate is electrically jointed to said second surface of said first flexible substrate; and
    at least one transistor amplifier and a plurality of lead wires formed on said upper surface of said second flexible substrate, wherein each of said lead wires is electrically connected with corresponding one of said second conducting wires respectively;
    wherein said first flexible substrate and said second flexible substrate are jointed by electrical conductive glue or solder, and electrical signals are transmitted between said biological probes and said transistor amplifiers by said first conducting wires, said second conducting wires and said lead wires.

2. The microarray bioprobe device integrated with a semiconductor amplifier module of claim 1, wherein said biological probes are arranged as a plurality of arrays.

3. The microarray bioprobe device integrated with a semiconductor amplifier module of claim 1, wherein each said biological probe has a tip end.

4. The microarray bioprobe device integrated with a semiconductor amplifier module of claim 3, further comprising an insulating protecting layer covering said transistor amplifiers and said lead wires.

5. The microarray bioprobe device integrated with a semiconductor amplifier module of claim 3, further comprising a power supply and a ground and output interface electrically connected to said transistor amplifiers.

6. The microarray bioprobe device integrated with a semiconductor amplifier module of claim 3, wherein a first layer of a surface of said biological probe is formed of nickel, chromium or other metals with high hardness and high adhesiveness.

7. The microarray bioprobe device integrated with a semiconductor amplifier module of claim 6, wherein said biological probe has a covering layer formed of titanium (Ti), titanium nitride (TiN) or other biological compatible metal with high hardness.

8. The microarray bioprobe device integrated with a semiconductor amplifier module of claim 3, wherein said electrical conductive glue is sliver glue.

9. The microarray bioprobe device integrated with a semiconductor amplifier module of claim 3, wherein said electrical conductive glue is double-sided electrical conductive film or double-sided electrical conductive tape.

10. The microarray bioprobe device integrated with a semiconductor amplifier module of claim 3, wherein said transistor amplifier comprises at least three first conductive type thin film transistors with top gates and at least one second conductive type thin film transistor with top gate.

11. The microarray bioprobe device integrated with a semiconductor amplifier module of claim 1, further comprising an insulating protecting layer covering said transistor amplifiers and said lead wires.

12. The microarray bioprobe device integrated with a semiconductor amplifier module of claim 1, further comprising a power supply and a ground and output interface electrically connected with said transistor amplifiers.

13. The microarray bioprobe device integrated with a semiconductor amplifier module of claim 1, wherein a first layer of a surface of said biological probe is formed of nickel, chromium or other metals with high hardness and high adhesiveness.

14. The microarray bioprobe device integrated with a semiconductor amplifier module of claim 13, wherein said biological probe has a covering layer formed of titanium (Ti), titanium nitride (TiN) or other biological compatible metal with high hardness.

15. The microarray bioprobe device integrated with a semiconductor amplifier module of claim 1, wherein said electrical conductive glue is sliver glue.

16. The microarray bioprobe device integrated with a semiconductor amplifier module of claim 1, wherein said electrical conductive glue is double-sided electrical conductive film or double-sided electrical conductive tape.

17. The microarray bioprobe device integrated with a semiconductor amplifier module of claim 1, wherein said transistor amplifier comprises at least three first conductive type thin film transistors with top gates and at least one second conductive type thin film transistor with top gate.

* * * * *